United States Patent
Kitano et al.

(10) Patent No.: US 11,446,894 B2
(45) Date of Patent: Sep. 20, 2022

(54) VEHICLE FRONT GLASS

(71) Applicant: SEKISUI CHEMICAL CO., LTD., Osaka (JP)

(72) Inventors: Hirofumi Kitano, Shiga (JP); Manabu Matsumoto, Shiga (JP); Kazuhiko Nakayama, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/819,650

(22) Filed: Mar. 16, 2020

(65) Prior Publication Data
US 2020/0223172 A1    Jul. 16, 2020

Related U.S. Application Data

(62) Division of application No. 14/906,591, filed as application No. PCT/JP2014/070404 on Aug. 1, 2014, now Pat. No. 10,632,712.

(30) Foreign Application Priority Data

Aug. 1, 2013    (JP) ................................. 2013-160505

(51) Int. Cl.
*B32B 3/28*    (2006.01)
*B32B 17/10*    (2006.01)
(Continued)

(52) U.S. Cl.
CPC .................. *B32B 3/28* (2013.01); *B32B 3/30* (2013.01); *B32B 17/10036* (2013.01);
(Continued)

(58) Field of Classification Search
CPC .. B32B 3/26; B32B 3/263; B32B 3/30; B32B 17/06; B32B 17/064; B32B 17/10;
(Continued)

(56) References Cited

U.S. PATENT DOCUMENTS 4,452,840 A    6/1984  Sato et al.
5,425,977 A  *  6/1995  Hopfe ............... B32B 17/10587
                                                                  428/141

(Continued)

FOREIGN PATENT DOCUMENTS

CA      2 388 107        5/2001
CN      103140452        6/2013
(Continued)

OTHER PUBLICATIONS

International Search Report dated Oct. 28, 2014 in International Application No. PCT/JP2014/070404.
(Continued)

*Primary Examiner* — Frank J Vineis
*Assistant Examiner* — Laura B Figg
(74) *Attorney, Agent, or Firm* — Wenderoth, Lind & Ponack, L.L.P.

(57) ABSTRACT

The present invention aims to provide a vehicular windshield having a laminated glass structure in which an interlayer film for laminated glass is interposed between at least a pair of glass plates, which contains few air bubbles remaining between the glass plates and the interlayer film (Continued)

for laminated glass to have an excellent appearance and is less likely to cause ghosting when external rays of light are seen through the vehicular windshield.

6 Claims, 3 Drawing Sheets

(51) Int. Cl.
  *B32B 3/30* (2006.01)
  *B32B 27/22* (2006.01)
(52) U.S. Cl.
  CPC .. *B32B 17/10587* (2013.01); *B32B 17/10761* (2013.01); *B32B 27/22* (2013.01); *B32B 2307/102* (2013.01); *B32B 2605/006* (2013.01)
(58) Field of Classification Search
  CPC .......... B32B 17/10165; B32B 17/1055; B32B 17/10559; B32B 17/10761; B32B 17/10568; B32B 17/10577; B32B 17/10587; B32B 27/06; B32B 27/30; B32B 27/306; B32B 17/10036; B32B 27/08; B32B 3/28; Y10T 428/24058; Y10T 428/24355; Y10T 428/24364; Y10T 428/24405; Y10T 428/24479; Y10T 428/24504; Y10T 428/24521; Y10T 428/24529; Y10T 428/24537; Y10T 428/2457; Y10T 428/24612; Y10T 428/2462; Y10T 428/24942; Y10T 428/2495; Y10T 428/24959; C03C 27/10; C08K 5/0016; C08K 5/103; C08L 29/14
  USPC ....... 428/105, 112, 141, 142, 147, 156, 159, 428/161, 162, 163, 167, 172, 173, 212, 428/213, 214
  See application file for complete search history.

(56) References Cited

U.S. PATENT DOCUMENTS

| | | |
|---|---|---|
| 6,093,471 A | 7/2000 | Hopfe |
| 2004/0191482 A1 | 9/2004 | Nakajima |
| 2006/0263608 A1 | 11/2006 | Choi |
| 2013/0202863 A1 | 8/2013 | Shimamoto et al. |
| 2013/0236711 A1* | 9/2013 | Lu .......................... B32B 27/30 428/213 |
| 2015/0174862 A1 | 6/2015 | Kitano et al. |

FOREIGN PATENT DOCUMENTS

| | | |
|---|---|---|
| EP | 1 233 007 | 8/2002 |
| EP | 2 520 551 | 11/2012 |
| EP | 2 674 295 | 12/2013 |
| EP | 2 881 376 | 6/2015 |
| JP | 10-45438 | 2/1998 |
| JP | 11-35348 | 2/1999 |
| JP | 2000-7390 | 1/2000 |
| JP | 2001-150540 | 6/2001 |
| JP | 2004-143008 | 5/2004 |
| JP | 2007-331959 | 12/2007 |
| JP | 2011-88783 | 5/2011 |
| RU | 2 264 360 | 11/2005 |
| WO | 2014/021459 | 2/2014 |

OTHER PUBLICATIONS

Extended European Search Report dated Feb. 15, 2017 in corresponding European Application No. 14831888.4.
Office Action dated Nov. 8, 2019 in European Application No. 14831888.4.

* cited by examiner

VEHICLE FRONT GLASS

TECHNICAL FIELD

The present invention relates to a vehicular windshield having a laminated glass structure in which an interlayer film for laminated glass including a laminate of two or more resin layers is interposed between at least a pair of glass plates, which contains few air bubbles remaining between the glass plates and the interlayer film for laminated glass to have an excellent appearance and is less likely to cause ghosting when external light rays are seen through the vehicular windshield.

BACKGROUND ART

A laminated glass obtainable by bonding two glass plates and an interlayer film for laminated glass containing plasticized polyvinyl butyral interposed between the two glass plates is widely used in particular as a vehicular windshield.

An interlayer film for laminated glass may include only one resin layer, or may include a laminate of two or more resin layers. Including a first resin layer and a second resin layer which have different properties as two or more resin layers, an interlayer film can have various properties that are hardly achieved by a monolayer structure.

Patent Literature 1, for example, discloses an interlayer film for laminated glass having a three-layer structure including a sound insulation layer and two protective layers interposing the sound insulation layer therebetween. The interlayer film for laminated glass of Patent Literature 1 includes a sound insulation layer containing a polyvinyl acetal resin that is highly compatible with a plasticizer and a large amount of a plasticizer to exhibit excellent sound-insulating properties. The protective layers prevent bleed-out of a large amount of the plasticizer contained in the sound insulation layer to prevent lowering of adhesiveness between the interlayer film and glass.

A laminated glass including such an interlayer film for laminated glass in which two or more resin layers are laminated together, however, may cause ghost images when external light rays are seen through the laminated glass. Such ghosting often occurs especially in the case of an interlayer film for laminated glass excellent in sound-insulating properties such as that disclosed in Patent Literature 1.

CITATION LIST

Patent Literature

Patent Literature 1: JP-A 2007-331959

SUMMARY OF INVENTION

Technical Problem

The present inventors studied about the cause of ghosting that occurs when an interlayer film for laminated glass including a laminate of two or more resin layers is used, and found out that ghosting is caused by projections and recesses formed on the surface of the interlayer film for laminated glass.

In common production of a laminated glass, a laminate including at least an interlayer film for laminated glass interposed between two glass plates are passed through nip rolls for deaeration (squeeze deaeration) or put in a rubber bag and vacuum suctioned (vacuum deaeration) to be pressure-bonded while the air remaining between the glass plate and the interlayer film is removed. The resulting laminate is pressurized with heat, for example, in an autoclave to be pressure-bonded. A laminated glass is produced in this manner. In production of a laminated glass, deaeration properties are important upon lamination of glass and an interlayer film for laminated glass. The interlayer film for laminated glass has fine projections and recesses formed on at least one surface for the purpose of ensuring deaeration properties in production of a laminated glass. In particular, when recesses among the projections and recesses have a groove shape with a continuous bottom (hereafter, also referred to as a "shape of an engraved line") and such recesses in the shape of engraved lines are regularly formed to be adjacently arranged in parallel with one another, the deaeration properties achieved are significantly excellent.

Projections and recesses formed on the surface of the interlayer film for laminated glass are commonly crushed upon pressure-bonding in production of a laminated glass. They therefore have hardly caused problems in the obtained laminated glass.

The present inventors, however, found that, in the case of an interlayer film for laminated glass including two or more resin layers laminated together, influence by the projections and recesses remains in the laminated glass obtained through the production process thereof to cause ghosting.

Specifically, in a case where projections and recesses are formed on the surface of an interlayer film for laminated glass including two or more resin layers laminated together with an embossing roll or the like, projections and recesses are not only formed on the surface of the interlayer film but also transferred to the interface of the layers by a pressure applied during the embossing treatment, so that the interface becomes not smooth. Especially, when recesses in the shape of engraved lines are formed on the surface, the recesses are presumably also transferred strongly to the interface of the layers. Though projections and recesses on the surface of the interlayer film are crushed upon pressure-bonding in the production process of a laminated glass, projections and recesses transferred to the interface of the layers are left to possibly cause a light interference phenomenon, resulting in ghosting. Especially, in an interlayer film for laminated glass excellent in sound-insulating properties as that disclosed in Patent Literature 1, the projections and recesses are likely to be transferred to the interface between a hard protective layer and a soft sound insulation layer upon production thereof on the surface of the protective layer, often resulting in ghosting.

Ghosting can be prevented if projections and recesses are not formed on the surface of the interlayer film for laminated glass. However, if no projections and recesses are formed, deaeration in production of a laminated glass may be insufficient, so that air bubbles are generated between a glass plate and an interlayer film to impair the appearance of the laminated glass to be obtained.

The present invention aims to, in consideration of the state of the art, provide a vehicular windshield having a laminated glass structure in which an interlayer film for laminated glass including a laminate of two or more resin layers is interposed between at least a pair of glass plates, which contains few air bubbles remaining between the glass plates and the interlayer film for laminated glass to have an excellent appearance and is less likely to cause ghosting when external rays of light are seen through the vehicular windshield.

Solution to Problem

The present invention provides a vehicular windshield having a laminated glass structure, including at least a pair of glass plates and an interlayer film for laminated glass interposed between the pair of glass plates, the interlayer film for laminated glass including a laminate of two or more resin layers and having a large number of recesses and a large number of projections on at least one surface, the recesses having a groove shape with a continuous bottom and being regularly arranged adjacently in parallel with one another, the surface with the large number of recesses and the large number of projections having a groove depth (Rzg) of the recesses determined in conformity with JIS B-0601 (1994) of 10 to 40 µm, the groove shape with a continuous bottom of the recesses on the surface of the interlayer film for laminated glass being arranged in a direction that forms an angle of 30° or less relative to a perpendicular direction of the vehicular windshield.

The present invention is specifically described in the following.

In the present invention, the phrase "having a large number of recesses and a large number of projections on at least one surface" also means that "a large number of recesses and a large number of projections are formed on at least one surface". The phrase "recesses having a groove shape with a continuous bottom and being regularly arranged adjacently in parallel with one another" also means that "recesses have a groove shape with a continuous bottom and recesses are formed in a regular manner in which recesses adjacent to each other are in parallel with each other". The phrase "the groove shape with a continuous bottom of the recesses on the surface of the interlayer film for laminated glass being arranged in a direction that forms an angle of 30° or less relative to a perpendicular direction of the vehicular windshield" also means that "the groove shape with a continuous bottom of the recesses formed on the surface of the interlayer film for laminated glass being arranged in a direction that forms an angle of 30° or less relative to a perpendicular direction of the vehicular windshield.

As a result of intensive studies, the present inventors found that, when the direction of the pattern of projections and recesses on the surface of an interlayer film for laminated glass is controlled, even an interlayer film for laminated glass including a laminate of two or more resin layers can exhibit excellent deaeration properties in production of a laminated glass. In such a case, a vehicular windshield can be provided which contains no air bubbles remaining between a glass plate and an interlayer film for laminated glass to have an excellent appearance and is less likely to cause ghosting when external light rays are seen through the vehicular windshield. The present invention was thus completed.

The vehicular windshield of the present invention has a laminated glass structure including at least a pair of glass plates and an interlayer film for laminated glass interposed between the pair of glass plates.

The glass plates may be commonly used transparent plate glass. Examples thereof include inorganic glass such as float plate glass, polished plate glass, molded plate glass, wired glass, wire-reinforced plate glass, colored plate glass, heat ray-absorbing glass, heat ray-reflecting glass, and green glass. UV-shielding glass having a UV-shielding coat layer on the surface of glass may also be used. Further, organic plastic plates such as polyethylene terephthalate, polycarbonate, and polyacrylate plates may also be used.

Two or more different glass plates may be used as the glass plates. For example, the interlayer film for laminated glass in the present invention may be interposed between a transparent float plate glass and a colored glass plate such as green glass to produce a laminated glass. Two or more glass plates different in thickness may be used as the glass plates.

The interlayer film for laminated glass has a large number of recesses and a large number of projections on at least one surface. This structure ensures deaeration properties in production of a laminated glass.

The projections and recesses may be present only on one surface of the interlayer film for laminated glass. Preferably, the projections and recesses are formed on both surfaces of the interlayer film for laminated glass because the deaeration properties are significantly improved.

The shape of the projections and recesses is at least a groove shape, and may be any shape commonly employed for projections and recesses formed on the surface of an interlayer film for laminated glass, such as a shape of engraved lines or a lattice. The shape of the projections and recesses may be a shape transferred from an embossing roll.

The projections may each have a top portion in a planar shape as illustrated in FIG. 1 or a non-planar shape as illustrated in FIG. 2. In a case where the projections each have a planar top portion, fine projections and recesses may be further formed on the plane of the top portion.

The projections among the projections and recesses may have the same height or different heights. The recesses corresponding to these projections may have the same depth or different depths as long as they each have a continuous bottom.

In the interlayer film for laminated glass, the recesses among the projections and recesses on at least one surface have a groove shape with a continuous bottom (shape of an engraved line) and are regularly arranged adjacently in parallel with one another. Commonly, easiness of deaeration upon pressure-bonding of a laminated glass component including an interlayer film for laminated glass interposed between two glass plates closely relates to the communication properties and smoothness of the bottoms of the recesses. By forming the projections and recesses on at least one surface of the interlayer film in a pattern of recesses in the shape of engraved lines arranged regularly in parallel with one another, the communication properties of the bottoms are further enhanced to markedly increase the deaeration properties.

The phrase "regularly arranged" means a state where the recesses in the shape of engraved lines are adjacently arranged in parallel with one another at equal intervals and a state where the recesses in the shape of engraved lines are adjacently arranged in parallel with one another at unequal intervals.

FIGS. 1 and 2 each schematically illustrate one example of the interlayer film for laminated glass in which recesses in the shape of engraved lines are arranged in parallel with one another at equal intervals.

FIG. 3 schematically illustrates one example of the interlayer film for laminated glass in which recesses in the shape of engraved lines are arranged in parallel with one another at unequal intervals. In FIG. 3, an interval A between recess 1 and recess 2 and an interval B between the recess 1 and recess 3 are different from each other.

In the vehicular windshield of the present invention, the groove shape with a continuous bottom of the recesses on the surface of the interlayer film for laminated glass is arranged in a direction that forms an angle of 30° or less relative to a perpendicular direction of the vehicular windshield.

A description is given on the angle formed by the perpendicular direction of the vehicular windshield and the direction of the recesses in the shape of engraved lines on the surface of the interlayer film for laminated glass in the present invention, with reference to FIGS. 4A to 4C.

FIG. 4A is a schematic front view of a vehicle with a vehicular windshield 11. The perpendicular direction of the vehicular windshield herein refers to a direction of a line drawn to pass through the center of the vehicular windshield mounted on a vehicle and be perpendicular to the vehicular windshield. Specifically, in FIG. 4A, the direction indicated by a dot-dash line 21 is the perpendicular direction of the vehicular windshield 11.

In FIG. 4C, dotted lines 31 indicate recesses having a groove shape with a continuous bottom (shape of an engraved line) on the surface of the interlayer film for laminated glass. In FIG. 4C, an angle formed between the perpendicular direction of the vehicular windshield and the direction of the recesses in the shape of engraved lines in the present invention is indicated by an angle C formed between the direction of the dot-dash line 21 and the direction of the dotted lines 31 that indicate the recesses having a groove shape with a continuous bottom (shape of an engraved line) on the surface of the interlayer film for laminated glass.

FIG. 4B illustrates a schematic side view of a vehicle with the vehicular windshield 11. A mounting angle D of the vehicular windshield 11 is set to about 20° to 90° In the case of a standard-sized passenger car, the mounting angle is set to about 30° to 50°. When the mounting angle D is smaller, a light interference phenomenon becomes stronger, leading to frequent occurrence of ghosting.

When the angle (angle C in FIG. 4C) between the perpendicular direction of the vehicular windshield and the direction of the recesses in the shape of engraved lines on the surface of the interlayer film for laminated glass is set to 30° or less, the deaeration properties are sufficiently exhibited in production of a laminated glass to provide a vehicular windshield containing no air bubbles remaining between a glass plate and an interlayer film for laminated glass to have an excellent appearance. Moreover, occurrence of ghosting is prevented when external light rays are seen through the vehicular windshield. This is presumably because an influence of light interference can be reduced as the direction of the recesses in the shape of engraved lines is close to the perpendicular direction of the vehicular windshield from the viewpoint of a passenger in the vehicle. The angle between the perpendicular direction of the vehicular windshield and the direction of the recesses in the shape of engraved lines on the surface of the interlayer film for laminated glass is preferably 20° or less, more preferably 15° or less, still more preferably 10° or less, particularly preferably 5° or less.

For more surely preventing occurrence of ghosting, the angle between the lengthwise direction of the vehicular windshield and the direction of the recesses in the shape of engraved lines is preferably 30° or less throughout the vehicular windshield. In an actual vehicle, a trapezoidal vehicular windshield as illustrated in FIGS. 4A to 4C is curved to be mounted. In such a structure, the lengthwise direction (the shortest line between the upper side and the lower side depending on the curvature of the glass) of the vehicular windshield is somewhat deviated from the perpendicular direction as the distance from the center of the vehicular windshield increases. For preventing occurrence of ghosting throughout the vehicular windshield, the angle between the lengthwise direction of the vehicular windshield and the direction of the recesses in the shape of engraved lines on the surface of the interlayer film for laminated glass is preferably 30° or less at any position on the vehicular windshield. In an actual normal-type vehicle, however, ghosting can be substantially prevented throughout the vehicular windshield when the perpendicular direction of the vehicular windshield and the direction of the recesses in the shape of engraved lines on the surface of the interlayer film for laminated glass form an angle of 30° or less. Upon lamination of an interlayer film for laminated glass between two trapezoidal glass plates, the interlayer film may have its bottom stretched to be formed into a trapezoidal shape before lamination thereof. In such a case, the lengthwise direction of the vehicular windshield and the direction of the recesses in the shape of engraved lines on the surface of the interlayer film for laminated glass form an angle of 30° or less in a wider range.

On the surface having a large number of recesses and a large number of projections, the recesses have a groove depth (Rzg) of 10 to 40 μm. When the groove depth (Rzg) is 10 μm or more, deaeration properties are significantly excellent. When the groove depth (Rzg) is 40 μm or less, the temperature for production of a laminated glass can be lowered. The lower limit of the groove depth (Rzg) is preferably 15 μm, whereas the upper limit thereof is preferably 35 μm. The lower limit is more preferably 20 μm, whereas the upper limit thereof is more preferably 30 μm.

The groove depth (Rzg) of the recesses as used herein means the average value based on the groove depths of the number of the measured grooves. The groove depths are calculated based on the average line (a line that is set such that the sum of the squares of the deviations from that line to the roughness curve be minimized) of a roughness curve, as specified in JIS B-0601(1994) "Surface Roughness—Definition and designation" with the standard length set to 2.5 mm. The number of grooves is an integer obtained by dividing the standard length by the interval of the recesses and rounding up digits after the decimal point. When the number of grooves is 5 or more, the groove depths of five deepest recesses present in the standard length are calculated, and the average value thereof is taken as the groove depth for the standard length. When the number of grooves is 4 or less, the groove depths of the number of grooves are calculated in descending order of the depth of recesses present in the standard length, and the average value thereof is taken as the groove depth for the standard length. The groove depth for the standard length is measured at least at five portions, and the average thereof is taken as the groove depth (Rzg) of the recesses. The groove depth (Rzg) is easily determined by processing data of a digital signal measured with a surface roughness measuring device (produced by Kosaka Laboratory Ltd., SE1700a).

In the interlayer film for laminated glass, the upper limit of the interval between adjacent recesses is preferably 1500 μm. In a case where the interval between adjacent recesses is 1500 μm or less, deaeration properties are especially excellent, so that a vehicular windshield containing no residual air bubbles to have an excellent appearance can be obtained. The upper limit of the interval between adjacent recesses is more preferably 1000 μm. The lower limit of the interval between adjacent recesses is not particularly limited. In terms of the processing for imparting projections and recesses, the lower limit is substantially about 10 μm.

The interval between recesses as used herein means the shortest distance between deepest bottoms of adjacent two recesses having a groove shape with a continuous bottom.

Specifically, the interval between recesses is determined as follows. The surface (observation range: 20 mm×20 mm) of the interlayer film for laminated glass is observed with an optical microscope (e.g., BS-8000III produced by SONIC Corp.), and all the shortest distances between deepest bottoms of observed adjacent recesses are measured. The average of the measured shortest distances is taken as the interval between recesses. Alternatively, the maximum value of the measured shortest distances may be set as the interval between recesses. The interval between recesses may be the average value or the maximum value of the shortest distances, and is preferably the average value of the shortest distances.

In the present invention, a large number of recesses and a large number of projections are formed on at least one surface of the interlayer film for laminated glass by, for example, an embossing roll method, a calender roll method, a profile extrusion method, an extrusion lip embossing method which takes advantage of melt fracture, or the like. In particular, preferred is an embossing roll method because the structure where the recesses in the shape of engraved lines are adjacently arranged in parallel with one another is easily achieved.

Exemplary embossing rolls used in the embossing roll method include an embossing roll having a fine emboss pattern (pattern of projections and recesses) on the roll surface which is prepared by blasting a metal roll with an abrasive material such as aluminum oxide or silicon oxide and lapping the surface through vertical grinding for the purpose of reducing excessive peaks. Other examples include an embossing roll having a fine emboss pattern (pattern of projections and recesses) on the roll surface which is prepared by transferring the emboss pattern (pattern of projections and recesses) to a metal roll surface with an engraving mill (mother mill). Other examples further include an embossing roll having a fine emboss pattern (pattern of projections and recesses) formed by etching (chemical engraving) on the roll surface.

The interlayer film for laminated glass has a laminate structure including two or more resin layers laminated together. For example, including a first resin layer and a second resin layer which have different properties as two or more resin layers, an interlayer film for laminated glass can have various properties that are hardly achieved by a monolayer structure. In a case where an interlayer film for laminated glass having a laminate structure including two or more resin layers laminated together is used for a vehicular windshield, however, a problem of ghosting arises.

The resin layers preferably contain a thermoplastic resin.

Examples of the thermoplastic resin include polyvinylidene fluoride, polytetrafluoroethylene, vinylidene fluoride-hexafluoropropylene copolymers, polytrifluoroethylene, acrylonitrile-butadiene-styrene copolymers, polyester, polyether, polyamide, polycarbonate, polyacrylate, polymethacrylate, polyvinyl chloride, polyethylene, polypropylene, polystyrene, polyvinyl acetal, and ethylene-vinyl acetate copolymers. In particular, the resin layers preferably contain polyvinyl acetal or ethylene-vinyl acetate copolymers. The resin layers more preferably contain polyvinyl acetal.

The resin layers preferably contain polyvinyl acetal and a plasticizer.

Any plasticizer may be used as long as it is a plasticizer commonly used for an interlayer film for laminated glass. Examples thereof include organic plasticizers such as monobasic organic acid esters or polybasic organic acid esters, and phosphoric acid plasticizers such as organophosphate compounds or organophosphite compounds.

Examples of the organic plasticizers include triethylene glycol-di-2-ethylhexanoate, triethylene glycol-di-2-ethylbutyrate, triethylene glycol-di-n-heptanoate, tetraethylene glycol-di-2-ethylhexanoate, tetraethylene glycol-di-2-ethyl butyrate, tetraethylene glycol-di-n-heptanoate, diethylene glycol-di-2-ethylhexanoate, diethylene glycol-di-2-ethylbutyrate, and diethylene glycol-di-n-heptanoate. In particular, the resin layers preferably contain triethylene glycol-di-2-ethylhexanoate, triethylene glycol-di-2-ethylbutyrate, or triethylene glycol-di-n-heptanoate, more preferably contain triethylene glycol-di-2-ethylhexanoate.

The resin layers preferably contain an adhesion modifier. Especially, a resin layer contacting glass in production of a laminated glass preferably contains the adhesion modifier.

The adhesion modifier is preferably, for example, an alkali metal salt or an alkaline earth metal salt. Examples of the adhesion modifier include salts such as potassium, sodium, or magnesium salt.

Examples of the acid constituting the salts include carboxylic organic acids such as octylic acid, hexylic acid, 2-ethylbutyric acid, butyric acid, acetic acid, and formic acid and inorganic acids such as hydrochloric acid and nitric acid. The resin layer contacting glass in production of a laminated glass preferably contains a magnesium salt as the adhesion modifier because adhesiveness between glass and the resin layer is easily adjusted.

The resin layers may optionally contain additives such as an antioxidant, a light stabilizer, a modified silicone oil as an adhesion modifier, a flame retardant, an antistatic agent, a damp proofing agents, a heat ray reflecting agent, or a heat ray absorbing agent.

The interlayer film for laminated glass includes at least a first resin layer and a second resin layer as two or more resin layers. The hydroxy group content of polyvinyl acetal (hereafter, referred to as polyvinyl acetal A) in the first resin layer is preferably different from the hydroxy group content of polyvinyl acetal (hereafter, referred to as polyvinyl acetal B) in the second resin layer.

Since the polyvinyl acetal A and the polyvinyl acetal B have different properties, various properties that cannot be achieved by a monolayer structure can be imparted to the interlayer film for laminated glass. For example, in a case where the first resin layer is interposed between two second resin layers and the hydroxy group content of the polyvinyl acetal A is smaller than the hydroxy group content of the polyvinyl acetal B, the first resin layer tends to have a lower glass transition temperature than the second resin layer. As a result, the first resin layer is softer than the second resin layer, so that the interlayer film for laminated glass has better sound-insulating properties. For another example, in a case where the first resin layer is interposed between two second resin layers and the hydroxy group content of the polyvinyl acetal A is greater than the hydroxy group content of the polyvinyl acetal B, the first resin layer tends to have a higher glass transition temperature than the second resin layer. As a result, the first resin layer is harder than the second resin layer, so that the interlayer film for laminated glass has better penetration resistance.

Moreover, in a case where the first resin layer and the second resin layer contain a plasticizer, the plasticizer content (hereafter, referred to as content A) in the first resin layer based on 100 parts by mass of polyvinyl acetal is preferably different from the plasticizer content (hereafter, referred to as content B) in the second resin layer based on 100 parts by mass of polyvinyl acetal. For example, in a case where the first resin layer is interposed between two second resin layers and the content A is greater than the content B, the first resin layer tends to have a lower glass transition temperature than the second resin layer. As a result, the first resin layer is softer than the second resin layer, so that the interlayer film for laminated glass has better sound-insulating properties. In a case where the first resin layer is interposed between two second resin layers and the content A is smaller than the content B, the first resin layer tends to have a higher glass transition temperature than the second resin layer. As a result, the first resin layer is harder than the second resin layer, so that the interlayer film for laminated glass has better penetration resistance.

An exemplary combination of two or more resin layers included in the interlayer film for laminated glass includes a sound insulation layer as the first resin layer and a protective layer as the second resin layer with an aim of improving the sound-insulating properties of the laminated glass. Preferably, the sound insulation layer contains polyvinyl acetal X and a plasticizer and the protective layer contains polyvinyl acetal Y and a plasticizer because the laminated glass can have better sound-insulating properties. Moreover, in a case where the sound insulation layer is interposed between two protective layers, an interlayer film for laminated glass excellent in sound-insulating properties (hereafter, also referred to as a sound-insulating interlayer film) can be obtained. According to the present invention, even an interlayer film for laminated glass including different resin layers, such as the sound insulation layer and the protective layer, laminated together can prevent ghosting. Hereafter, a sound-insulating interlayer film is more specifically described.

In the sound-insulating interlayer film, the sound insulation layer has a function of imparting sound-insulating properties.

The sound insulation layer preferably contains polyvinyl acetal X and a plasticizer.

The polyvinyl acetal X can be prepared by acetalization of polyvinyl alcohol with an aldehyde. Commonly, the polyvinyl alcohol can be obtained by saponification of polyvinyl acetate.

The lower limit of the average degree of polymerization of the polyvinyl alcohol is preferably 200, whereas the upper limit thereof is preferably 5000. When the average degree of polymerization of the polyvinyl alcohol is 200 or higher, the penetration resistance of the sound-insulating interlayer film to be obtained can be improved. When the average degree of polymerization of the polyvinyl alcohol is 5000 or lower, formability of the sound insulation layer can be ensured. The lower limit of the average degree of polymerization of the polyvinyl alcohol is more preferably 500, whereas the upper limit thereof is more preferably 4000.

The average degree of polymerization of the polyvinyl alcohol is determined by a method in conformity with JIS K6726 "Testing methods for polyvinyl alcohol."

The lower limit of the carbon number of an aldehyde used for acetalization of the polyvinyl alcohol is preferably 4, whereas the upper limit thereof is preferably 6. When the carbon number of the aldehyde is 4 or more, the sound insulation layer can stably contain a sufficient amount of a plasticizer to exhibit excellent sound-insulating properties. Moreover, bleed-out of the plasticizer can be prevented. When the carbon number of the aldehyde is 6 or less, synthesis of the polyvinyl acetal X is facilitated to ensure the productivity.

The C4-C6 aldehyde may be a linear or branched aldehyde, and examples thereof include n-butyraldehyde and n-valeraldehyde.

The upper limit of the hydroxy group content of the polyvinyl acetal X is preferably 30 mol %. When the hydroxy group content of the polyvinyl acetal X is 30 mol % or less, the sound insulation layer can contain the plasticizer in an amount needed for exhibiting sound-insulating properties and bleed-out of the plasticizer can be prevented. The upper limit of the hydroxy group content of the polyvinyl acetal X is more preferably 28 mol %, still more preferably 26 mol %, particularly preferably 24 mol %, whereas the lower limit thereof is preferably 10 mol %, more preferably 15 mol %, still more preferably 20 mol %.

The hydroxy group content of the polyvinyl acetal X is a value in percentage (mol %) of the mol fraction obtained by dividing the amount of ethylene groups to which a hydroxy group is bonded by the amount of all the ethylene groups in the backbone. The amount of ethylene groups to which a hydroxy group is bonded can be obtained by measuring the amount of ethylene groups to which a hydroxy group is bonded in the polyvinyl acetal X by a method in conformity with JIS K6728 "Testing methods for polyvinyl butyral."

The lower limit of the acetal group content of the polyvinyl acetal X is preferably 60 mol %, whereas the upper limit thereof is preferably 85 mol %. When the acetal group content of the polyvinyl acetal X is 60 mol % or more, the sound insulation layer has higher hydrophobicity and can contain a plasticizer in an amount needed for exhibiting sound-insulating properties, leading to prevention of bleed-out of the plasticizer and whitening. When the acetal group content of the polyvinyl acetal X is 85 mol % or less, synthesis of the polyvinyl acetal X is facilitated to ensure the productivity. The lower limit of the acetal group content of the polyvinyl acetal X is more preferably 65 mol %, still more preferably 68 mol %.

The acetal group content can be obtained by measuring the amount of ethylene groups to which an acetal group is bonded in the polyvinyl acetal X by a method in conformity with JIS K6728 "Testing methods of polyvinyl butyral."

The lower limit of the acetyl group content of the polyvinyl acetal X is preferably 0.1 mol %, whereas the upper limit thereof is preferably 30 mol %. When the acetyl group content of the polyvinyl acetal X is 0.1 mol % or more, the sound insulation layer can contain a plasticizer in an amount needed for exhibiting sound-insulating properties, leading to prevention of bleed-out of the plasticizer. When the acetyl group content of the polyvinyl acetal X is 30 mol % or less, the sound insulation layer has higher hydrophobicity to prevent whitening. The lower limit of the acetyl group content is more preferably 1 mol %, still more preferably 5 mol %, particularly preferably 8 mol %, whereas the upper limit thereof is more preferably 25 mol %, still more preferably 20 mol %. The acetyl group content is a value in percentage (mol %) of the mol fraction obtained by subtracting the amount of ethylene groups to which an acetal group is bonded and the amount of ethylene groups to which a hydroxy group is bonded from the amount of all the ethylene groups in the backbone and dividing the resulting value by the amount of all the ethylene groups in the backbone.

The polyvinyl acetal X is especially preferably polyvinyl acetal with the acetyl group content of 8 mol % or more or polyvinyl acetal with the acetyl group content of less than 8 mol % and the acetal group content of 65 mol % or more because the sound insulation layer can easily contain a plasticizer in an amount needed for exhibiting sound-insulating properties. The polyvinyl acetal X is more preferably polyvinyl acetal having an acetyl group content of 8 mol % or more or polyvinyl acetal having an acetyl group content of less than 8 mol % and an acetal group content of 68 mol % or more.

The lower limit of the plasticizer content in the sound insulation layer is preferably 45 parts by mass, whereas the upper limit thereof is preferably 80 parts by mass based on 100 parts by mass of the polyvinyl acetal X. When the plasticizer content is 45 parts by mass or more, high sound-insulating properties can be exhibited. When the plasticizer content is 80 parts by mass or less, bleed-out of the plasticizer is prevented, so that the transparency or adhesiveness of the interlayer film for laminated glass is not lowered. The lower limit of the plasticizer content is more preferably 50 parts by mass, still more preferably 55 parts by mass, whereas the upper limit thereof is more preferably 75 parts by mass, still more preferably 70 parts by mass.

The lower limit of the thickness of the sound insulation layer is preferably 0.05 mm. When the thickness of the sound insulation layer is 0.05 mm or more, sufficient sound-insulating properties can be exhibited. The lower limit of the thickness of the sound insulation layer is more preferably 0.08 mm. The upper limit thereof is not particularly limited, and is preferably 0.3 mm in consideration of the thickness as an interlayer film for laminated glass.

The protective layer has a function of preventing bleed-out of a large amount of a plasticizer contained in the sound insulation layer to prevent lowering of the adhesiveness between the interlayer film for laminated glass and glass and imparting penetration resistance to the interlayer film for laminated glass.

The protective layer preferably contains, for example, polyvinyl acetal Y and a plasticizer, more preferably polyvinyl acetal Y with a greater hydroxy group content than the polyvinyl acetal X and a plasticizer.

The polyvinyl acetal Y can be prepared by acetalization of polyvinyl alcohol with an aldehyde.

The polyvinyl alcohol can be commonly obtained by saponification of polyvinyl acetate.

The lower limit of the average degree of polymerization of the polyvinyl alcohol is preferably 200, whereas the upper limit thereof is preferably 5000. When the average degree of polymerization of the polyvinyl alcohol is 200 or more, the penetration resistance of the interlayer film for laminated glass can be improved. When the average degree of polymerization of the polyvinyl alcohol is 5000 or less, the formability of the protective layer can be ensured. The lower limit of the average degree of polymerization of the polyvinyl alcohol is more preferably 500, whereas the upper limit thereof is more preferably 4000.

The lower limit of the carbon number of an aldehyde used for acetalization of the polyvinyl alcohol is preferably 3, whereas the upper limit thereof is preferably 4. When the carbon number of the aldehyde is 3 or more, the penetration resistance of the interlayer film for laminated glass is improved. When the carbon number of the aldehyde is 4 or less, the productivity of the polyvinyl acetal Y is improved.

The C3-C4 aldehyde may be a linear or branched aldehyde, and examples thereof include n-butyraldehyde.

The upper limit of the hydroxy group content of the polyvinyl acetal Y is preferably 33 mol %, whereas the lower limit thereof is preferably 28 mol %. When the hydroxy group content of the polyvinyl acetal Y is 33 mol % or less, whitening of the interlayer film for laminated glass can be prevented. When the hydroxy group content of the polyvinyl acetal Y is 28 mol % or more, the penetration resistance of the interlayer film for laminated glass can be improved.

The lower limit of the acetal group content of the polyvinyl acetal Y is preferably 60 mol %, whereas the upper limit thereof is preferably 80 mol %. When the acetal group content is 60 mol % or more, the protective layer can contain a plasticizer in an amount needed for exhibiting sufficient penetration resistance. When the acetal group content is 80 mol % or less, the adhesiveness between the protective layer and glass can be ensured. The lower limit of the acetal group content is more preferably 65 mol %, whereas the upper limit thereof is more preferably 69 mol %.

The upper limit of the acetyl group content of the polyvinyl acetal Y is preferably 7 mol %. When the acetyl group content of the polyvinyl acetal Y is 7 mol % or less, the protective layer has higher hydrophobicity, thereby preventing whitening. The upper limit of the acetyl group content is more preferably 2 mol %, whereas the lower limit thereof is preferably 0.1 mol %. The hydroxy group contents, acetal group contents, and acetyl group contents of the polyvinyl acetal A, B, and Y can be measured by the similar method as in the case of the polyvinyl acetal X.

The lower limit of the plasticizer content in the protective layer is preferably 20 parts by mass, whereas the upper limit thereof is preferably 45 parts by mass based on 100 parts by mass of the polyvinyl acetal Y. When the plasticizer content is 20 parts by mass or more, the penetration resistance can be ensured. When the plasticizer content is 45 parts by mass or less, bleed-out of the plasticizer can be prevented, so that the transparency or adhesiveness of the interlayer film for laminated glass is not lowered. The lower limit of the plasticizer content is more preferably 30 parts by mass, still more preferably 35 parts by mass, whereas the upper limit thereof is more preferably 43 parts by mass, still more preferably 41 parts by mass. The plasticizer content in the protective layer is preferably smaller than the plasticizer content in the sound insulation layer because sound-insulating properties can be further improved in the laminated glass.

The hydroxy group content of the polyvinyl acetal Y is preferably greater than the hydroxy group content of the polyvinyl acetal X, more preferably greater by 1 mol % or more, still more preferably greater by 5 mol % or more, particularly preferably greater by 8 mol % or more because the sound-insulating properties of the laminated glass is further improved. Adjustment of the hydroxy group contents of the polyvinyl acetal X and the polyvinyl acetal Y allows control of the plasticizer contents in the sound insulation layer and the protective layer, lowering the glass transition temperature of the sound insulation layer. As a result, the sound-insulating properties of the laminated glass are further improved.

The plasticizer content (hereafter, also referred to as the content X) based on 100 parts by mass of the polyvinyl acetal X in the sound insulation layer is preferably greater than the plasticizer content (hereafter, also referred to as the content Y) based on 100 parts by mass of the polyvinyl acetal Y in the protective layer, more preferably greater by 5 parts by mass or more, still more preferably greater by 15 parts by mass or more, particularly preferably greater by 20 parts by mass or more because the sound-insulating properties of the laminated glass is still further improved. Adjustment of the content X and the content Y lowers the glass transition temperature of the sound insulation layer. As a result, the sound-insulating properties of the laminated glass are still further improved.

The lower limit of the thickness of the protective layer is preferably 0.2 mm, whereas the upper limit thereof is preferably 3 mm. When the thickness of the protective layer is 0.2 mm or more, the penetration resistance can be ensured.

The lower limit of the thickness of the protective layer is more preferably 0.3 mm, whereas the upper limit thereof is more preferably 1.5 mm. The upper limit is still more preferably 0.5 mm, particularly preferably 0.4 mm.

The sound-insulating interlayer film may be produced by any method. In an exemplary method, the sound insulation layer and the protective layer are each formed in a sheet shape by a conventional sheet-forming method such as an extrusion method, a calender method, or a press method, and the resulting layers are laminated.

The present invention also encompasses a vehicular windshield including at least a pair of glass plates and an interlayer film for laminated glass interposed between the pair of glass plates, the interlayer film for laminated glass including a laminate of a sound insulation layer interposed between two protective layers, the sound insulation layer containing 45 to 80 parts by mass of a plasticizer based on 100 parts by mass of polyvinyl acetal, the protective layers each containing 20 to 45 parts by mass of a plasticizer based on 100 parts by mass of polyvinyl acetal, at least one of the protective layers having a large number of recesses and a large number of projections on a surface, the recesses having a groove shape with a continuous bottom and being regularly arranged adjacently in parallel with one another, the groove shape with a continuous bottom of the recesses on the surface of the at least one of the protective layers being arranged in a direction that forms an angle of 30° or less relative to a perpendicular direction of the vehicular windshield.

In the present invention, the phrase "at least one of the protective layers having a large number of recesses and a large number of projections on a surface" also means that "a large number of recesses and a large number of projections are formed on a surface of at least one protective layer." The phrase "recesses having a groove shape with a continuous bottom and being regularly arranged adjacently in parallel with one another" also means that "recesses each have a groove shape with a continuous bottom, and the recesses are formed in a regular manner in which recesses adjacent to each other are in parallel with each other." The phrase "the groove shape with a continuous bottom of the recesses on the surface of the at least one of the protective layers being arranged in a direction that forms an angle of 30° or less relative to a perpendicular direction of the vehicular windshield" also means that "the groove shape with a continuous bottom of the recesses formed on the surface of the at least one of the protective layers being arranged in a direction that forms an angle of 30° or less relative to a perpendicular direction of the vehicular windshield."

The vehicular windshield of the present invention may be produced by any method, and a conventionally known method may be employed. In an exemplary method, an interlayer film for laminated glass is interposed between at least two glass plates to give a laminated glass component. At this time, the interlayer film for laminated glass is arranged in such a manner that the recesses having a groove shape with a continuous bottom on the surface of the interlayer film for laminated glass forms an angle of 30° or less relative to the perpendicular direction of the vehicular windshield. The resulting laminated glass component is passed through nip rolls for deaeration (squeeze deaeration) or put in a rubber bag and vacuum suctioned (vacuum deaeration) to be pressure-bonded while air remaining between the glass plates and the interlayer film was removed. Then, the resulting glass component is pressurized with heat, for example, in an autoclave to be pressure-bonded. A vehicular windshield can be produced in this manner.

Advantageous Effects of Invention

The present invention can provide a vehicular windshield having a laminated glass structure in which an interlayer film for laminated glass including a laminate of two or more resin layers is interposed between at least a pair of glass plates, which contains few air bubbles remaining between the glass plates and the interlayer film for laminated glass to have an excellent appearance and is less likely to cause ghosting when external light rays are seen through the vehicular windshield.

BRIEF DESCRIPTION OF DRAWINGS

FIG. 4A is a schematic front view of a vehicle with a vehicular windshield 11; FIG. 4B illustrates a schematic side view of a vehicle with the vehicular windshield 11; and FIG. 4C shows the recesses having a groove shape with a continuous bottom (shape of an engraved line) on the surface of the interlayer film for laminated glass.

DESCRIPTION OF EMBODIMENTS

Figure 1:
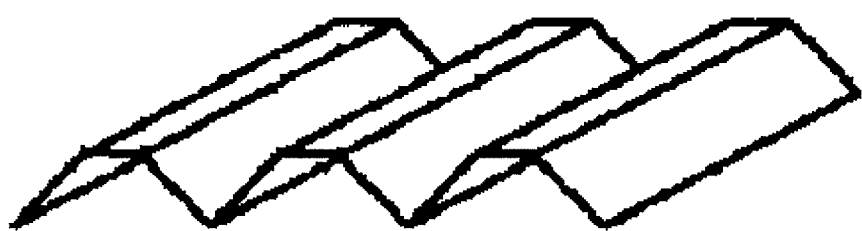
FIG. 1 is a schematic view illustrating an example of an interlayer film for laminated glass in which recesses having a groove shape with a continuous bottom are arranged at equal intervals and adjacently in parallel with one another on a surface.
Figure 2:
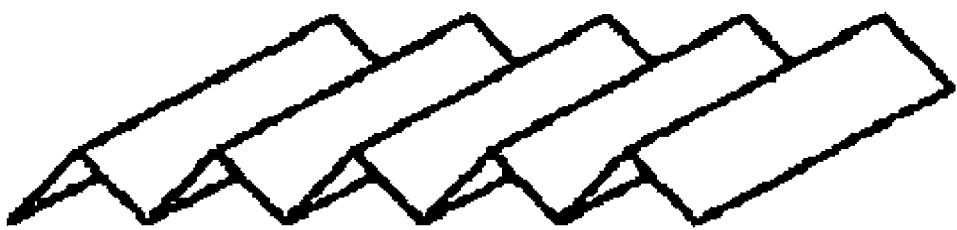
FIG. 2 is a schematic view illustrating an example of an interlayer film for laminated glass in which recesses having a groove shape with a continuous bottom are arranged at equal intervals and adjacently in parallel with one another on a surface.
Figure 3:
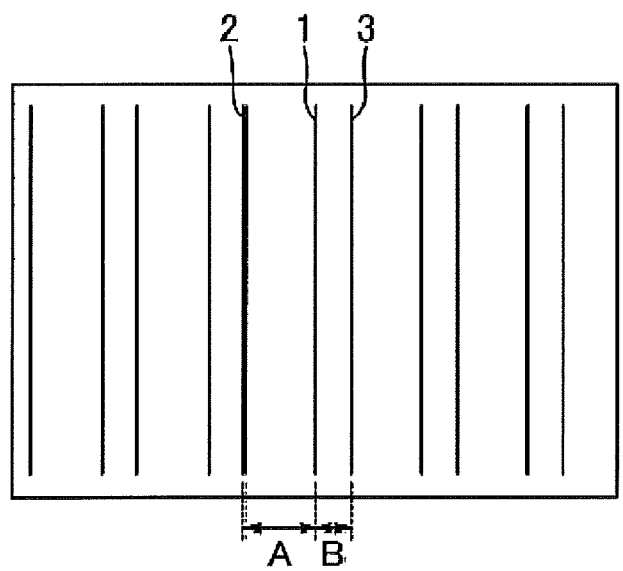
FIG. 3 is a schematic view illustrating an example of an interlayer film for laminated glass in which recesses having a groove shape with a continuous bottom are arranged at unequal intervals and adjacently in parallel with one another on a surface.
Figure 4A:
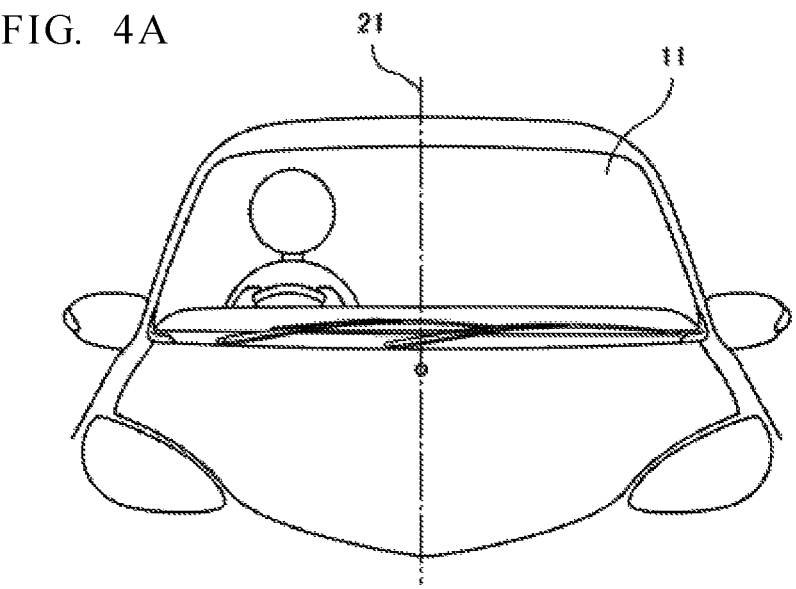
FIGS. 4A to 4C provide schematic views for explaining the angle formed between the perpendicular direction of the vehicular windshield and the direction of the recesses in the shape of engraved lines on the surface of the interlayer film for laminated glass. Specifically.
Figure 4B:
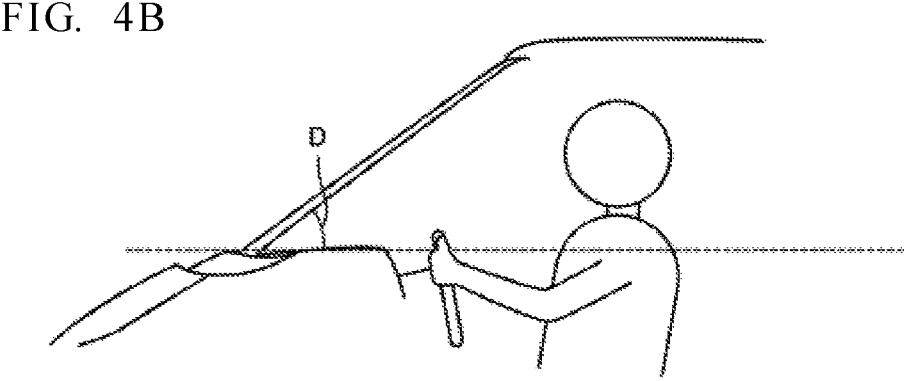
Figure 4C:
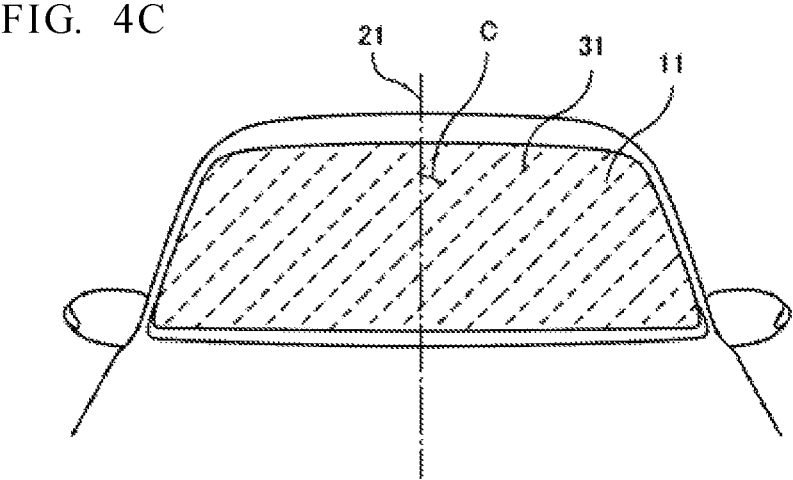

Embodiments of the present invention are more specifically described in the following with reference to, but not limited to, examples.

Example 1

(1) Preparation of Resin Composition for Sound Insulation Layer

Polyvinyl butyral (acetyl group content of 12 mol %, butyral group content of 66 mol %, hydroxy group content of 22 mol %) was prepared by acetalization of polyvinyl alcohol having an average degree of polymerization of 2400 with n-butyraldehyde. An amount of 100 parts by mass of the obtained polyvinyl butyral was blended with 60 parts by mass of triethylene glycol-di-2-ethylhexanoate (3GO) as a plasticizer and sufficiently kneaded with a mixing roll to give a resin composition for a sound insulation layer.

(2) Preparation of Resin Composition for Protective Layer

Polyvinyl butyral (acetyl group content of 1 mol %, butyral group content of 69 mol %, hydroxy group content of 30 mol %) was prepared by acetalization of polyvinyl alcohol having an average degree of polymerization of 1700 with n-butyraldehyde. An amount of 100 parts by mass of the obtained polyvinyl butyral was blended with 40 parts by mass of triethylene glycol-di-2-ethylhexanoate (3GO) as a plasticizer and sufficiently kneaded with a mixing roll to give a resin composition for a protective layer.

(3) Production of Interlayer Film for Laminated Glass

The obtained resin composition for a sound insulation layer and the resin composition for a protective layer were co-extruded from a co-extruder to produce an interlayer film (sound-insulating interlayer film) for laminated glass having a triple layer structure in which an layer A (protective layer) formed of the resin composition for a protective layer with a thickness of 350 μm, a layer B (sound insulation layer) formed of the resin composition for a sound insulation layer with a thickness of 100 μm, and a layer C (protective layer) formed of the resin composition for a protective layer with a thickness of 350 μm are laminated in said order.

(4) Impartment of Projections and Recesses

In the first step, a pattern of projections and recesses was randomly transferred to both surfaces of the interlayer film for laminated glass by the following process. First, random projections and recesses were formed on iron roll surfaces with an abrasive material, and the iron rolls were subjected to vertical grinding. Finer projections and recesses were further formed on planar portions after the grinding with a finer abrasive material. In this manner, a pair of rolls in the same shape having a coarse main embossed pattern and a fine sub-embossed pattern were obtained. The pair of rolls were used as a device for transferring a pattern of projections and recesses to transfer a random pattern of projections and recesses to both faces of the obtained interlayer film for laminated glass. The transferring conditions employed here were a temperature of the interlayer film for laminated glass of 80° C., a temperature of the rolls of 145° C., a linear velocity of 10 m/min, and a linear pressure of 10 to 200 kN/m. The shaped interlayer film for laminated glass had a surface roughness measured based on the ten-point average roughness Rz in accordance with JIS B 0601(1994) of 20 μm. The surface roughness was determined by processing data of a digital signal measured with a surface roughness measuring device (produced by Kosaka Laboratory Ltd., SE1700a). The measurement direction was perpendicular to the engraved lines. Measurement was performed under the conditions of a cut-off value of 2.5 mm, a standard length of 2.5 mm, an evaluation length of 12.5 mm, a tip radius of a probe of 2 μm, a tip angle of 60°, and a measurement speed of 0.5 mm/s.

In the second step, projections and recesses having a groove shape with a continuous bottom (shape of an engraved line) were imparted to a surface of the interlayer film for laminated glass by the following process.

A pair of rolls including a metal roll having a surface milled with a triangular oblique line-type mill (produced by YURIROLL Co., Ltd.) and a rubber roll having a JIS hardness of 45 to 75 was used as a device for transferring a pattern of projections and recesses. The obtained interlayer film for laminated glass to which the random pattern of projections and recesses was transferred in the first step was passed through the device for transferring a pattern of projections and recesses, whereby projections and recesses in which recesses having a groove shape with a continuous bottom (shape of an engraved line) were arranged in parallel with one another at equal intervals were imparted to the surface of the layer A of the interlayer film for laminated glass. The transferring was performed under the conditions of a temperature of the interlayer film for laminated glass of ambient temperature, a roll temperature of 130° C., a linear velocity of 10 m/min, a film width of 1.5 m, and a pressure of 500 kPa.

Figure 5:
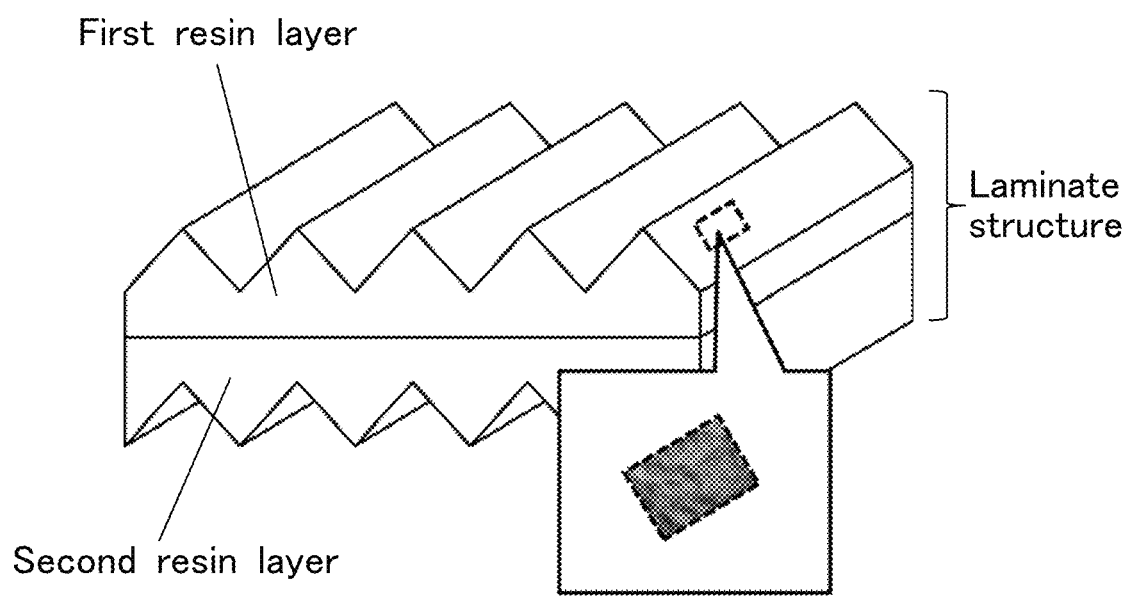
FIG. 5 is a schematic view illustrating an example of an interlayer film for laminated glass made of a laminate of two or more resin layers, and having a plurality of recesses and a plurality of projections on its surfaces, including a random pattern of recesses and projections (magnified portion), and a regularly arranged pattern of recesses and projections, wherein the regularly arranged pattern of recesses are recesses having a groove shape with a continuous bottom that are regularly arranged adjacently in parallel with one another and the regularly arranged pattern of projections are projections regularly arranged adjacently in parallel with one another.

Subsequently, the similar treatment was performed to impart recesses having a groove shape with a continuous bottom (shape of an engraved line) to the surface of the layer C of the interlayer film for laminated glass, except that the shape of the projections and recesses on a metal roll used was different. An interlayer film for laminated glass having the random pattern of recesses and projections and the regularly arranged pattern of recesses and projections, wherein the regularly arranged pattern of recesses are recesses having a groove shape with a continuous bottom that are regularly arranged adjacently in parallel with one another and the regularly arranged pattern of projections are projections regularly arranged adjacently in parallel with one another, is illustrated in FIG. 5.

The surfaces (observation range of 20 mm×20 mm) of the layer A and the layer C of the obtained interlayer film for the laminated glass were observed with an optical microscope (produced by SONIC, BS-8000III) to measure the interval between adjacent recesses. The average value of the shortest distance between the deepest bottoms of adjacent recesses was taken as the interval between recesses. The interval between the recesses on the layer A was 750 μm. The interval between the recesses on the layer C was 500 μm. The average value and the maximum value of the shortest distances were the same on each layer.

The groove depth (Rzg) of the recesses on the surfaces of the layer A and the layer C of the obtained interlayer film for laminated glass was the average value of the groove depths for the standard length measured at five points. The groove depths were calculated based on the average line (a line that is set such that the sum of the squares of the deviations from that line to the roughness curve be minimized) of a roughness curve, as specified in JIS B-0601(1994) "Surface roughness-Definition and designation" with the standard length set to 2.5 mm. The average of the groove depths of the number of the measured grooves was taken as the groove depth for the standard length. The number of grooves of the layer A was 4 and the number of grooves of the layer C was 5. The groove depth (Rzg) of the recesses on each of the surfaces of the layer A and the layer C was determined by processing data of a digital signal measured with a surface roughness measuring device (produced by Kosaka Laboratory Ltd., SE1700a). The measurement direction was perpendicular to the engraved line. Measurement was performed under the conditions of a tip radius of a probe of 2 μm, a tip angle of 60°, and a measurement speed of 0.5 mm/s. The groove depth (Rzg) of the recesses on the surface of the layer A was 22 μm. The groove depth (Rzg) of the recesses on the surface of the layer C was 18 μm.

(5) Preparation of Vehicular Windshield

A vehicular windshield was produced by preliminarily pressure-bonding the obtained interlayer film for laminated glass having projections and recesses on the surface by vacuum deaeration, followed by full pressure-bonding thereof, as described below.

(Direction Adjustment of Interlayer Film for Laminated Glass)

The interlayer film was interposed between two clear glass plates for vehicular windshield (in the shape as illustrated in FIGS. 4A to 4C, 2.5 mm in thickness). The portions of the film protruding from the plates were cut off. A laminated glass component was thus prepared.

At this time, the interlayer film for laminated glass was arranged in such a manner that the direction of the recesses in the shape of engraved lines on the surface of the layer A forms an angle of 0° relative to the perpendicular direction of the vehicular windshield and the direction of the recesses in the shape of engraved lines on the surface of the layer C forms an angle of 10° relative to the perpendicular direction of the vehicular windshield.

(Vacuum Deaeration Method)

The obtained laminated glass component was placed into a rubber bag, which was connected to a vacuum suction device. The rubber bag was held under a reduced pressure of −60 kPa (absolute pressure of 16 kPa) for 10 minutes with heating so that the temperature (preliminary pressure-bonding temperature) of the laminated glass component reached 70° C. Thereafter, the pressure was returned to atmospheric pressure, whereby the preliminary pressure-bonding was completed. The preliminary pressure-bonding was performed under three different conditions of the deaeration starting temperature of 40° C., 50° C., and 60° C.

(Full Pressure-Bonding)

The laminated glass component preliminarily pressure-bonded by the above method was placed in an autoclave and held under the conditions of a temperature of 140° C. and a pressure of 1300 kPa for 10 minutes. Thereafter, the temperature was lowered to 50° C. and the pressure was returned to atmospheric pressure, whereby the full pressure-bonding was completed. In this manner, a vehicular windshield was produced.

Examples 2 to 11

Interlayer films for laminated glass were produced in the same manner as in Example 1, except that the kind of the triangular oblique line-type mill used in impartment of projections and recesses was changed and that the interval and the groove depth (Rzg) of the recesses on the surface of the layer A and the layer C were changed as shown in Table 1.

Vehicular windshields were produced in the same manner as in Example 1, except that the interlayer film for laminated glass was arranged in production of the vehicular windshield in such a manner that the direction of the recesses in the shape of engraved lines formed an angle as shown in Table 1 relative to the perpendicular direction of the vehicular windshield.

Examples 12 to 15

Interlayer films for laminated glass were produced in the same manner as in Example 1, except that the acetyl group content, the butyral group content, and the hydroxy group content of the polyvinyl butyral used for the protective layer and the sound insulation layer and the plasticizer content were changed as shown in Table 1 and that the kind of the triangular oblique line-type mill used in impartment of projections and recesses was changed, and that the interval and the groove depth (Rzg) of the recesses on the surface of the layer A and the layer C were changed as shown in Table 1. The polyvinyl butyral used for the protective layer and the sound insulation layer was obtained by acetalization of polyvinyl alcohol having an average degree of polymerization of 1700 with n-butyraldehyde.

Vehicular windshields were produced in the same manner as in Example 1, except that the direction of the recesses in the shape of engraved lines on the surface of the obtained interlayer film for laminated glass was set to form an angle as shown in Table 1 relative to the perpendicular direction of the vehicular windshield.

Comparative Examples 1 to 4

Interlayer films for laminated glass were produced in the same manner as in Example 1, except that the kind of the triangular oblique line-type mill used in impartment of projections and recesses was changed and that the interval and the groove depth (Rzg) of the recesses on the surface of the layer A and the layer C were changed as shown in Table 2.

Vehicular windshields were produced in the same manner as in Example 1, except that the direction of the recesses in the shape of engraved lines on the surface of the obtained interlayer film for laminated glass was set to form an angle as shown in Table 2 relative to the perpendicular direction of the vehicular windshield.

(Evaluation)

The vehicular windshields obtained in the examples and comparative examples were evaluated as follows.

Tables 1 and 2 show the results. In the tables, the Bu degree means the butyral group content, the OH degree means the hydroxy group content, the Ac degree means the acetyl group content, and Plasticizer (parts) means the plasticizer content based on 100 parts by mass of polyvinyl butyral.

(1) Evaluation on Appearance

The obtained vehicular windshield was heated in an oven at 140° C. for two hours. Thereafter, the vehicular windshield was taken out of the oven and allowed to stand to cool for three hours. The appearance of the cooled vehicular windshield was visually observed. Twenty vehicular windshields were tested, and the number of vehicular windshields in which foam (air bubbles) was generated between the glass plate and the interlayer film for laminated glass was determined. When the number of the vehicular windshields with bubbles was 5 or less under all conditions, it was evaluated "O (good)". When the number of the vehicular windshields with bubbles was 6 or more under all conditions, it was evaluated as "x (poor)".

(2) Evaluation on Ghosting

The light source was a 10 W silica bulb (produced by Kyokko Electric Co., Ltd., PS55 E 26 110V-10W, total flux of 70 lm) to simulate a light source having a general intensity which can be incident on windowpanes of automobiles, aircraft, buildings or the like. Evaluation on ghosting on the obtained vehicular windshield was performed by a method in conformity with JIS R 3212 (2008). An image with a separation of more than 6.5 minutes of arc was regarded to be a ghost image. An image with a separation of 6.5 minutes of arc or less was regarded to be a single image. When a single image with a separation of 3.5 minutes of arc or less was observed, it was evaluated as "OO (excellent)". When a single image with a separation of more than 3.5 minutes of arc but not more than 6.5 minutes of arc was observed, it was evaluated as "O (good)". When a ghost image was observed, it was evaluated as "x (poor)".

The mounting angle to the actual vehicle was set to 20°.

TABLE 1

| | | | Example 1 | | | Example 2 | | | Example 3 | | | Example 4 | | | Example 5 | | |
|---|---|---|---|---|---|---|---|---|---|---|---|---|---|---|---|---|---|
| Formulation | Composition of protective layer | Bu degree (mol %) | 69 | | | 69 | | | 69 | | | 69 | | | 69 | | |
| | | OH degree (mol %) | 30 | | | 30 | | | 30 | | | 30 | | | 30 | | |
| | | Ac degree (mol %) | 1 | | | 1 | | | 1 | | | 1 | | | 1 | | |
| | | Pasticizer (parts) (phr) | 40 | | | 40 | | | 40 | | | 40 | | | 40 | | |
| | Composition of sound insulation layer | Bu degree (mol %) | 66 | | | 66 | | | 66 | | | 66 | | | 66 | | |
| | | OH degree (mol %) | 22 | | | 22 | | | 22 | | | 22 | | | 22 | | |
| | | Ac degree (mol %) | 12 | | | 12 | | | 12 | | | 12 | | | 12 | | |
| | | Plasticizer (parts) (phr) | 60 | | | 60 | | | 60 | | | 60 | | | 60 | | |
| Projections and recesses on surface of layer A | Interval of recesses (μm) | | 750 | | | 750 | | | 750 | | | 750 | | | 750 | | |
| | Groove depth (Rzg) of recesses (μm) | | 30 | | | 24 | | | 22 | | | 20 | | | 40 | | |
| | Angle of direction of recesses in the shape of engraved lines (°) | | 0 | | | 20 | | | 0 | | | 5 | | | 0 | | |
| Projections and recesses on surface of layer C | Interval of recesses (μm) | | 500 | | | 500 | | | 500 | | | 500 | | | 500 | | |
| | Groove depth (Rzg) of recesses (μm) | | 24 | | | 19 | | | 19 | | | 17 | | | 37 | | |
| | Angle of direction of recesses in the shape of engraved lines (°) | | 10 | | | 30 | | | 30 | | | 15 | | | 10 | | |
| Evaluation on deaeration properties | Deaeration starting temperature/° C. | | 40 | 50 | 60 | 40 | 50 | 60 | 40 | 50 | 60 | 40 | 50 | 60 | 40 | 50 | 60 |
| | Preliminary pressure-bonding completion temperature/° C. | | 70 | 70 | 70 | 70 | 70 | 70 | 70 | 70 | 70 | 70 | 70 | 70 | 70 | 70 | 70 |
| | Baking test (Number of vehicular windshields with bubbles/20 vehicular windshields) | | 0 ○ | 0 | 1 | 0 ○ | 1 | 1 | 0 ○ | 0 | 1 | 0 ○ | 1 | 1 | 0 ○ | 0 | 0 |
| | Evaluation on ghosting | | ○○ | | | ○ | | | ○ | | | ○○ | | | ○○ | | |

| | | | Example 6 | | | Example 7 | | | Example 8 | | | Example 9 | | | Example 10 | | |
|---|---|---|---|---|---|---|---|---|---|---|---|---|---|---|---|---|---|
| Formulation | Composition of protective layer | Bu degree (mol %) | 69 | | | 69 | | | 69 | | | 69 | | | 69 | | |
| | | OH degree (mol %) | 30 | | | 30 | | | 30 | | | 30 | | | 30 | | |
| | | Ac degree (mol %) | 1 | | | 1 | | | 1 | | | 1 | | | 1 | | |
| | | Pasticizer (parts) (phr) | 40 | | | 40 | | | 40 | | | 40 | | | 40 | | |
| | Composition of sound insulation layer | Bu degree (mol %) | 66 | | | 66 | | | 66 | | | 66 | | | 66 | | |
| | | OH degree (mol %) | 22 | | | 22 | | | 22 | | | 22 | | | 22 | | |
| | | Ac degree (mol %) | 12 | | | 12 | | | 12 | | | 12 | | | 12 | | |
| | | Plasticizer (parts) (phr) | 60 | | | 60 | | | 60 | | | 60 | | | 60 | | |
| Projections and recesses on surface of layer A | Interval of recesses (μm) | | 750 | | | 400 | | | 400 | | | 300 | | | 300 | | |
| | Groove depth (Rzg) of recesses (μm) | | 12 | | | 16 | | | 18 | | | 18 | | | 23 | | |
| | Angle of direction of recesses in the shape of engraved lines (°) | | 0 | | | 0 | | | 20 | | | 5 | | | 10 | | |
| Projections and recesses on surface of layer C | Interval of recesses (μm) | | 500 | | | 400 | | | 400 | | | 400 | | | 400 | | |
| | Groove depth (Rzg) of recesses (μm) | | 10 | | | 21 | | | 15 | | | 23 | | | 15 | | |
| | Angle of direction of recesses in the shape of engraved lines (°) | | 10 | | | 10 | | | 20 | | | 10 | | | 20 | | |
| Evaluation on deaeration properties | Deaeration starting temperature/° C. | | 40 | 50 | 60 | 40 | 50 | 60 | 40 | 50 | 60 | 40 | 50 | 60 | 40 | 50 | 60 |
| | Preliminary pressure-bonding completion temperature/° C. | | 70 | 70 | 70 | 70 | 70 | 70 | 70 | 70 | 70 | 70 | 70 | 70 | 70 | 70 | 70 |
| | Baking test (Number of vehicular windshields with bubbles/20 vehicular windshields) | | 0 | 1 ○ | 2 | 0 ○ | 0 | 1 | 1 ○ | 1 | 1 | 0 ○ | 1 | 1 | 0 ○ | 1 | 1 |
| Evaluation on ghosting | | | ○○ | | | ○○ | | | ○ | | | ○○ | | | ○ | | |

TABLE 2

| | | | Example 11 | Example 12 | Example 13 | Example 14 | Example 15 |
|---|---|---|---|---|---|---|---|
| Formulation | Composition of protective layer | Bu degree (mol %) | 69 | 69 | 68.5 | 69 | 69.9 |
| | | OH degree (mol %) | 30 | 30 | 31 | 30.5 | 29 |
| | | Ac degree (mol %) | 1 | 1 | 0.5 | 0.5 | 1.1 |
| | | Plasticizer (parts) (phr) | 40 | 36 | 36 | 37.5 | 39 |
| | Composition of sound insulation layer | Bu degree (mol %) | 66 | 65.5 | 67 | 71 | 78 |
| | | OH degree (mol %) | 22 | 24.5 | 25 | 23 | 20.5 |
| | | Ac degree (mol %) | 12 | 10 | 8 | 6 | 1.5 |
| | | Plasticizer (parts) (phr) | 60 | 75 | 75 | 76 | 77 |

TABLE 2-continued

|  |  | | | | | | | | | | | | | | | |
|---|---|---|---|---|---|---|---|---|---|---|---|---|---|---|---|---|
| Projections and recesses on surface of layer A | Interval of recesses (μm) | | 190 | | | 750 | | | 750 | | | 750 | | | 750 | |
|  | Groove depth (Rzg) of recesses (μm) | | 15 | | | 30 | | | 12 | | | 12 | | | 12 | |
|  | Angle of direction of recesses in the shape of engraved lines (°) | | 20 | | | 0 | | | 0 | | | 0 | | | 0 | |
| Projections and recesses on surface of layer C | Interval of recesses (μm) | | 195 | | | 500 | | | 500 | | | 500 | | | 500 | |
|  | Groove depth (Rzg) of recesses (μm) | | 15 | | | 24 | | | 10 | | | 10 | | | 10 | |
|  | Angle of direction of recesses in the shape of engraved lines (°) | | 10 | | | 10 | | | 10 | | | 10 | | | 10 | |
| Evaluation on deaeration properties | Deaeration starting temperature/° C. | 40 | 50 | 60 | 40 | 50 | 60 | 40 | 50 | 60 | 40 | 50 | 60 | 40 | 50 | 60 |
|  | Preliminary pressure-bonding completion temperature/° C. | 70 | 70 | 70 | 70 | 70 | 70 | 70 | 70 | 70 | 70 | 70 | 70 | 70 | 70 | 70 |
|  | Baking test (Number of vehicular windshields with bubbles/20 vehiclar windshields) | 0 | 0 | 0 | 0 | 0 | 1 | 0 | 0 | 1 | 0 | 0 | 1 | 0 | 0 | 1 |
|  |  | | ○ | | | ○ | | | ○ | | | ○ | | | ○ | |
|  | Evaluation on ghosting | | ○○ | | | ○○ | | | ○○ | | | ○○ | | | ○○ | |

|  |  | | Comparative Example 1 | | | Comparative Example 2 | | | Comparative Example 3 | | | Comparative Example 4 | | |
|---|---|---|---|---|---|---|---|---|---|---|---|---|---|---|
| Formulation | Composition of protective layer | Bu degree (mol %) | | 69 | | | 69 | | | 69 | | | 69 | |
|  |  | OH degree (mol %) | | 30 | | | 30 | | | 30 | | | 30 | |
|  |  | Ac degree (mol %) | | 1 | | | 1 | | | 1 | | | 1 | |
|  |  | Plasticizer (parts) (phr) | | 40 | | | 40 | | | 40 | | | 40 | |
|  | Composition of sound insulation layer | Bu degree (mol %) | | 66 | | | 66 | | | 66 | | | 66 | |
|  |  | OH degree (mol %) | | 22 | | | 22 | | | 22 | | | 22 | |
|  |  | Ac degree (mol %) | | 12 | | | 12 | | | 12 | | | 12 | |
|  |  | Plasticizer (parts) (phr) | | 60 | | | 60 | | | 60 | | | 60 | |
| Projections and recesses on surface of layer A | Interval of recesses (μm) | | | 750 | | | 750 | | | 750 | | | 750 | |
|  | Groove depth (Rzg) of recesses (μm) | | | 28 | | | 22 | | | 9 | | | 9 | |
|  | Angle of direction of recesses in the shape of engraved lines (°) | | | 30 | | | 80 | | | 0 | | | 0 | |
| Projections and recesses on surface of layer C | Interval of recesses (μm) | | | 500 | | | 500 | | | 500 | | | 500 | |
|  | Groove depth (Rzg) of recesses (μm) | | | 25 | | | 17 | | | 7 | | | 7 | |
|  | Angle of direction of recesses in the shape of engraved lines (°) | | | 40 | | | 90 | | | 10 | | | 10 | |
| Evaluation on deaeration properties | Deaeration starting temperature/° C. | | 40 | 50 | 60 | 40 | 50 | 60 | 40 | 50 | 60 | 40 | 50 | 60 |
|  | Preliminary pressure-bonding completion temperature/° C. | | 70 | 70 | 70 | 70 | 70 | 70 | 70 | 70 | 70 | 70 | 70 | 70 |
|  | Baking test (Number of vehicular windshields with bubbles/20 vehiclar windshields) | | 0 | 0 | 1 | 0 | 0 | 1 | 6 | 7 | 9 | 6 | 7 | 9 |
|  |  | | | ○ | | | ○ | | | x | | | x | |
|  | Evaluation on ghosting | | | x | | | x | | | ○○ | | | ○○ | |

INDUSTRIAL APPLICABILITY

The present invention can provide a vehicular windshield having a laminated glass structure in which an interlayer film for laminated glass is interposed between at least a pair of glass plates, which contains few air bubbles remaining between the glass plates and the interlayer film for laminated glass to have an excellent appearance and is less likely to cause ghosting when external rays of light are seen through the vehicular windshield.

REFERENCE SIGNS LIST

1. Arbitrarily selected recess
2. Recess adjacent to the arbitrarily selected recess
3. Recess adjacent to the arbitrarily selected recess
A. Interval between recess 1 and recess 2
B. Interval between recess 1 and recess 3
11. Vehicular windshield
21. Perpendicular direction of vehicular windshield
31. Recess having a groove shape with a continuous bottom (shape of engraved line) on surface of interlayer film for laminated glass
C. Angle between perpendicular direction of vehicular windshield and direction of recess in the shape of engraved line
D. Mounting angle of vehicular windshield

The invention claimed is:

1. A vehicular windshield having a laminated glass structure, comprising at least a pair of glass plates and an interlayer film for laminated glass interposed between the pair of glass plates,
   wherein the interlayer film for laminated glass includes a laminate of two or more resin layers and has a plurality of recesses and a plurality of projections on an upper surface and a lower surface, wherein a random pattern of recesses and projections are formed in a first step, and thereafter a regularly arranged pattern of recesses and projections are formed in a second step wherein the regularly arranged pattern of recesses are recesses having a groove shape with a continuous bottom that are regularly arranged adjacently in parallel with one another and the regularly arranged pattern of projections are projections regularly arranged adjacently in parallel with one another,
   the surfaces with the plurality of recesses and the plurality of projections have a groove depth (Rzg) of the recesses having the groove shape with a continuous bottom determined in conformity with JIS B-0601 (1994) of 10 to 40 μm, and
   the groove shape with a continuous bottom of the recesses having the groove shape with a continuous bottom on the surfaces of the interlayer film for laminated glass are arranged in a direction that forms an angle of 30° or less relative to a perpendicular direction of the vehicular windshield.

2. The vehicular windshield according to claim 1, wherein the recesses having the groove shape with a continuous bottom on each surface of the interlayer film for laminated glass are arranged adjacently in parallel with one another at equal intervals.

3. The vehicular windshield according to claim 1, wherein the resin layers included in the interlayer film for laminated glass each contain polyvinyl acetal and a plasticizer.

4. The vehicular windshield according to claim 3, wherein the interlayer film for laminated glass includes at least a first resin layer and a second resin layer, and the polyvinyl acetal in the first resin layer has a hydroxy group content different from a hydroxy group content of the polyvinyl acetal in the second resin layer.

5. The vehicular windshield according to claim 3, wherein a plasticizer content based on 100 parts by mass of the polyvinyl acetal in the first resin layer is different from a plasticizer content based on 100 parts by mass of the polyvinyl acetal in the second resin layer.

6. The vehicular windshield according to claim 1, wherein an interval between adjacent recesses having the groove shape with a continuous bottom of the interlayer film for laminated glass is 1000 μm or less.

* * * * *